Nov. 26, 1968    E. VON WASIELEWSKI    3,412,660
EXPOSURE CONTROL DEVICE FOR PHOTOGRAPHIC CAMERAS
Filed March 4, 1966    2 Sheets-Sheet 1

INVENTOR.
ERWIN VON WASIELEWSKI
BY
Michael J. Striker

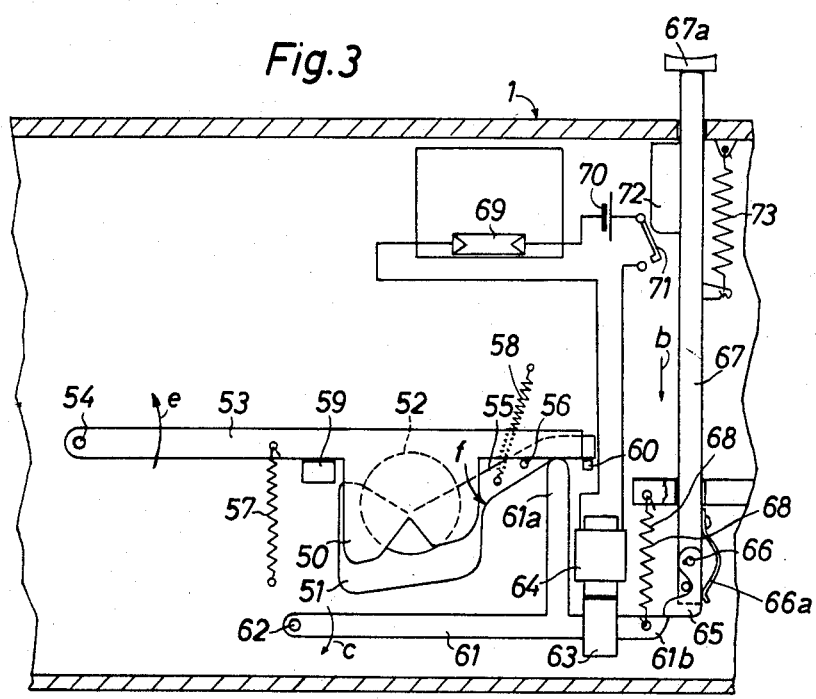
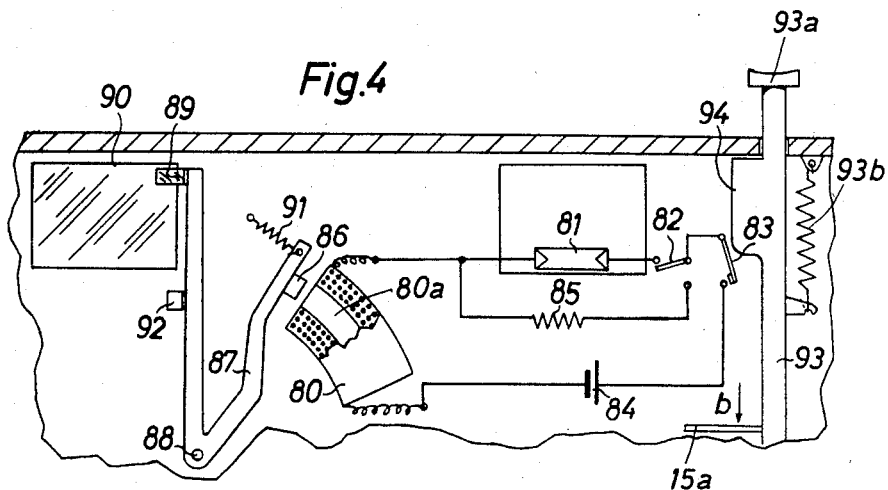

United States Patent Office 3,412,660
Patented Nov. 26, 1968

3,412,660
EXPOSURE CONTROL DEVICE FOR
PHOTOGRAPHIC CAMERAS
Erwin von Wasielewski, Munich, Germany, assignor to
Agfa-Gevaert Aktiengesellschaft, Leverkusen, Germany
Filed Mar. 4, 1966, Ser. No. 531,835
Claims priority, application Germany, Mar. 13, 1965,
A 48,628
22 Claims. (Cl. 95—10)

The present invention relates to photographic cameras in general, and more particularly to improvements in cameras of the type wherein the shutter is operated in response to impacts or impetus received from a suitable impulse member or impeller. Still more particularly, the invention relates to an improved exposure control device for such cameras.

It is an important object of the present invention to provide a camera with a very simple, compact, rugged and inexpensive exposure control device which can be installed in many presently known types of cameras.

Another object of the invention is to provide an exposure control device which comprises a small number of relatively simple components and which can regulate not only the exposure time but also the effective size of the diaphragm opening.

A further object of the invention is to provide an exposure control device which may determine one or more exposure values as a function of the intensity of light coming from a viewed scene or subject.

An additional object of my present invention is to provide an exposure control device which selects one or more exposure values in automatic respone to manual operation of a suitable trigger.

A concomitant object of the invention is to provide an exposure control device which, though primarily intended to regulate the exposure time, can take into account other considerations, particularly the size of the diaphragm opening.

Still another object of the invention is to provide an exposure control device which can automatically prevent overexposure or underexposure and which can be provided with means for warning the operator not to make an exposure when the lighting conditions are unsatisfactory.

A further object of the invention is to provide a camera which embodies an exposure control device of the above outlined characteristics and to equip the camera with very simple, compact and inexpensive means enabling the user to test the condition of a battery or another source of electrical energy which is utilized as part of the improved exposure control device.

A concomitant object of the instant invention is to provide an electrical exposure control device whose circuit is very simple and wherein the strength of mechanical impulses transmitted to one or more sectors of a shutter may be regulated by a variable electromagnetic field which is built up in automatic response to such manipulation of the camera as is required to make an exposure.

An ancillary object of the invention is to provide a novel and improved electric circuit for an exposure control device is the just outlined characteristics.

Briefly stated, one feature of my present invention resides in the provision of a camera which comprises a housing, means provided in said housing to define a diaphragm opening, a shutter comprising at least one sector or blade movable between a closed position and an open position in which the sector respectively conceals and exposes at least a portion of the diaphragm opening, an impeller movable from a cocked position toward a position of rest and arranged to thereby transmit to the sector an impetus in a direction to move the sector from closed position, and an exposure control device including electromagnetic means for regulating the extent and/or the speed of movement of the sector from closed position. The electromagnetic means comprises a coil which is energizable to produce an electromagnetic field and one or more fixed and/or variable resistors or light-sensitive cells connected in circuit with the coil to control the strength of the electromagnetic field.

The electromagnetic field may directly oppose the movement of the sector or sectors from closed position. Alternatively, the electromagnetic field may directly oppose movement of the impeller toward the position of rest. In both instances, the opposition offered by the electromagnetic field must be overcome by expending a certain portion of the impetus so that only the remainder of the impetus may be utilized to move the sector or sectors of the shutter from closed position.

The sector or sectors are preferably biased by spring means tending to move them to closed position with a constant force. Further spring means are provided to urge the impeller toward the position of rest with a constant force. The means for cocking the impeller preferably comprises a rockable or reciprocable trigger which may be moved by hand and may carry a trip to close a normally open control switch in the circuit of the coil so that the coil is energized before the impeller is fully cocked. This insures that the electromagnetic field can build up in good time before the sector or sectors of the shutter receive an impetus in response to movement of the impeller to its position of rest.

The novel features which are considered as characteristic of the invention are set forth in particular in the appended claims. The improved exposure control device itself, however, both as to its construction and its mode of operation, together with additional features and advantages thereof, will be best understood upon perusal of the following detailed description of certain specific embodiments with reference to the accompanying drawings, in which:

Figure 1:
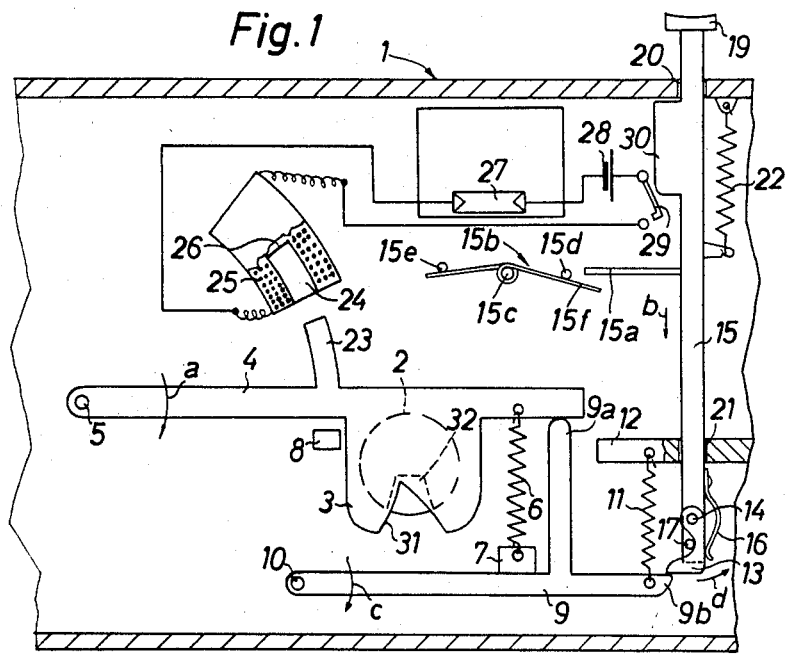
FIG. 1 is a diagrammatic front elevational view of a portion of a still camera which comprises an exposure control device embodying one form of my invention.

FIG. 3 is a further fragmentary front elevational view of a camera which embodies a third exposure control device; and FIG. 4 illustrates a portion of a camera which embodies the exposure control device of FIG. 1 and is further provided with a signaling unit which can indicate the condition of the current source and also whether or not the intensity of incoming light is satisfactory for making an exposure.

FIG. 1 illustrates a portion of a still camera which comprises a housing 1 including a wall formed with a diaphragm opening 2. In this embodiment of my invention, the shutter comprises a single blade or sector 3 which is located directly in front of the diaphragm opening 2 and is integral with an arm 4 rockable about a pivot pin 5 fixed to the housing 1. The arm 4 is biased with a constant force by a return spring 6 one end of which is attached to a fixed lug 7 and which tends to maintain the shutter blade 3 in the closed position shown in FIG. 1 whereby the blade prevents light rays coming from a viewed scene or subject from reaching an unexposed frame of the film, not shown. The direction in which the arm 4 is biased by the spring 6 is indicated by an arrow $a$. A fixed stop 8 determines the maximum extent of movement of the arm 4 and shutter blade 3 in the direction of the arrow $a$.

The blade 3 may be moved to an open position in response to impetus or mechanical impacts received from an impeller or impulse member 9 which resembles a lever and is rockable on a fixed pivot pin 10. A propelling or driving spring 11 is attached to the free end portion 9b of the impeller 9 and tends to turn the latter in a counter-clockwise direction, as viewed in FIG. 1, always with a constant force. The upper end of the spring 11 is attached to a member 12 which forms part of or is affixed to the housing 1. When the impeller 9 assumes the position of rest (which is shown in FIG. 1), it abuts against a fixed stop, for example, against the lug 7 for the spring 6. The arm 4 of the shutter blade 3 then abuts against an upwardly projecting extension or stud 9a of the impeller 9 and is lifted off the stop 8.

The means for displacing or cocking the impeller 9 by moving it from the position of rest (i.e., in a direction as indicated by the arrow c) comprises a combined cocking and release trigger 15 which is reciprocable in fixed bearings 20, 21 and the lower end portion of which carries a motion transmitting member here shown as a pawl 13 which is pivotable on a pin 14 of the trigger 15 and is biased by a leaf spring 16 which tends to maintain it in abutment with a stop pin 17 on the trigger. When it is compelled to move against the action of the spring 16, the pawl 13 turns in a counterclockwise direction as indicated by the arrow d.

The upper end portion of the trigger 15 extends from the housing 1 and carries an actuating or depressing member in the form of a pushbutton 19 which can be shifted by hand to move the trigger in the direction indicated by an arrow b. The trigger 15 then moves against the action of a relatively strong return spring 22 one end of which is attached to the housing 1 and which tends to maintain a laterally extending trip 30 of the trigger in abutment with the bearing 20. FIG. 1 shows the trigger 15 in its idle position.

The exposure control device which serves to select the exposure time and the effective size of the opening 2 comprises a permanent magnet 23 which is attached to or integral with the arm 4 of the shutter blade 3. This permanent magnet 23 is of arcuate shape and may extend into the space 24 defined by an energizable coil 25. In the uppermost or fully open position of the shutter blade 3, the top face of the permanent magnet 23 abuts against an arresting face 26 at the upper end of the space 24. The coil 25 is fixedly mounted in the housing 1 and is connected in circuit with a normally open control switch 29, a battery 28 or another suitable source of electrical energy, and a variable resistor 27, preferably a light-sensitive resistor which is at least partially exposed to light rays coming from a viewed scene or subject so that its resistance varies as a function of the intensity of incoming light. The parts 27, 28, 29 are connected in series and the control switch 29 may be closed by the trip 30 immediately after the pushbutton 19 is depressed to move the trigger 15 from its idle position. It is to be noted that the stop face 26 is located substantially midway between the ends of the coil 25.

The construction of the coil 25 and the bias of the spring 6 are selected in such a way that the travel of the shutter blade 3 in a direction counter to that indicated by the arrow a is terminated before the blade fully exposes the diaphragm opening 2, at least when the intensity of light reaching the resistor 27 attains a medium value or a relatively high value. The blade 3 is further provided with a substantially V-shaped cutout 31 which is bounded by two arcuate edge faces and travels across the diaphragm opening 2 when the arm 4 moves away from the fixed stop 8 or from the extension 9a of the impeller 9. A portion of the diaphragm opening 2 is permanently screened by a fixed mask or shield 32 which overlies the bottom part of the cutout 31 when the shutter blade 3 is allowed to assume its closed position.

In order to make an exposure, the operator applies finger pressure against the pushbutton 19 so as to displace the trigger 15 against the bias of the return spring 22 (arrow b). Immediately after the trigger 15 leaves its idle position, the trip 30 closes the control switch 29 to thus complete the circuit of the coil 25 whereby a current flows through the windings and the coil produces an electromagnetic field which tends to repel the permanent magnet 23. The strength of the current and the strength of the electromagnetic field are determined by the momentary resistance of the resistor 27, and such resistance is a function of the intensity of incoming light. In other words, the strength of the electromagnetic field is also a function of light intensity.

The operator continues to depress the pushbutton 19 whereby the pawl 13 bears against the end portion 9b of the impeller 9 and causes the spring 11 to store energy. Thus, the impeller 9 is cocked by moving in the direction indicated by the arrow c and its extension 9a moves away from the arm 4 so that the latter follows the bias of its spring 6 and moves into abutment with the stop 8. The extension 9a continues to move away from the arm 4 until the end portion 9b allows the pawl 13 to pass therebeyond whereby the spring 11 contracts and propels the impeller 9 in a counterclockwise direction so that the extension 9a transmits an impetus to the arm 4 and shutter blade 3. The magnitude of such impetus or impact is always the same because the pawl 13 can bypass the end portion 9b in an accurately selected angular position of the impeller 9. This impeller is automatically arrested when it reaches the lug 7.

The impetus transmitted by the extension 9a of the impeller 9 causes the arm 4 to turn in a counterclockwise direction and to move the permanent magnet 23 into the space 24 against the opposition of the electromagnetic field produced by the coil 25. This opposition is stronger if the electromagnetic field is stronger, i.e., if the intensity of light which reaches the resistor 27 is greater. It is well known that a light-sensitive resistor will offer lesser resistance to the flow of an electric current if it is placed into a stronger light. Like poles of the electromagnet including the coil 25 and of the permanent magnet 23 are adjacent to each other so that the coil tends to repel the permanent magnet and hence the arm 4 and shutter blade 3. If the strength of the electromagnetic field produced by the coil 25 is greater, the arm 4 is brought to a halt more rapidly and the exposure time is shorter because the spring 6 immediately returns the blade 3 to closed position. If the intensity of incoming light is weaker, the electromagnetic field produced by the coil 25 is also weaker and such field offers lesser resistance to penetration of the permanent magnet 23 into the space 24. When the light intensity reaches a certain low value, the top face of the permanent magnet 23 may actually reach the stop face 26 at the upper end of the space 24, i.e., the electromagnetic field produced by the coil 25 is then unable to oppose the impact transmitted by the impeller 9 to such an extent that the shutter blade 3 would be prevented from moving to its fully open position. This means that the exposure time is longer because more time is required by the blade 3 to move from its closed position to fully open position (when the permanent magnet 23 strikes against the stop face 26) and back to closed position. Also, the effective size of the diaphragm opening 2 is then allowed to assume a maximum value.

It will be seen that the exact position of the point where the shutter blade 3 changes the direction of its movement and begins to move back to closed position depends solely on the electromagnetic field of the coil 25. The bias of the spring 6 is constant and the strength of impacts transmitted by the impeller 9 is also constant because the pawl 13 invariably releases the impeller 9 when the latter assumes a predetermined angular position. Thus, by the simple expedient of making the strength of the electromagnetic field of the coil 25 dependent on the intensity of incoming light, the camera of FIG. 1 can select the exposure time and the effective size of the diaphragm opening as an accurate function of such intensity.

When the operator's finger releases the pushbutton 19, the return spring 22 contracts and moves the trigger 15 upwardly. The impeller 9 already abuts against the fixed lug 7 and causes the pawl 13 to yield (arrow *d*) against the bias of the leaf spring 16 so that its tip can bypass the end portion 9*b*. As soon as the pawl 13 bypasses the end portion 9*b*, the spring 16 immediately returns it into abutment with the stop pin 17 of the trigger 15. The latter comes to rest in its idle position when the trip 30 strikes against the bearing 20. During the last stage of its return movement to the position of FIG. 1, the trip 30 moves away from the control switch 29 so that the latter opens in a fully automatic way and thus interrupts the flow of electric current through the coil 25. The electromagnetic field of this coil collapses and the camera is ready to make a new exposure.

The trigger 15 is preferably provided with a laterally extending projection 15*a* which can engage and flex one terminal 15*f* of a torsion spring 15*b* coiled around a post 15*c* and normally abutting against two stop pins 15*d*, 15*e*. The spring 15*b* acts not unlike an indicator or signal generator to inform the operator that the control switch 29 is closed but that the operator must continue to exert finger pressure upon the pushbutton 19 in order to move the pawl 13 beyond the end portion 9*b* of the impeller 9. In other words, the operator's finger will sense the added resistance offered by the spring 15*b* against further displacement of the trigger 15 when the terminal 15*f* is engaged by the projection 15*a*. The purpose of the projection 15*a* and spring 15*b* will be explained in connection with FIG. 4.

Figure 2:
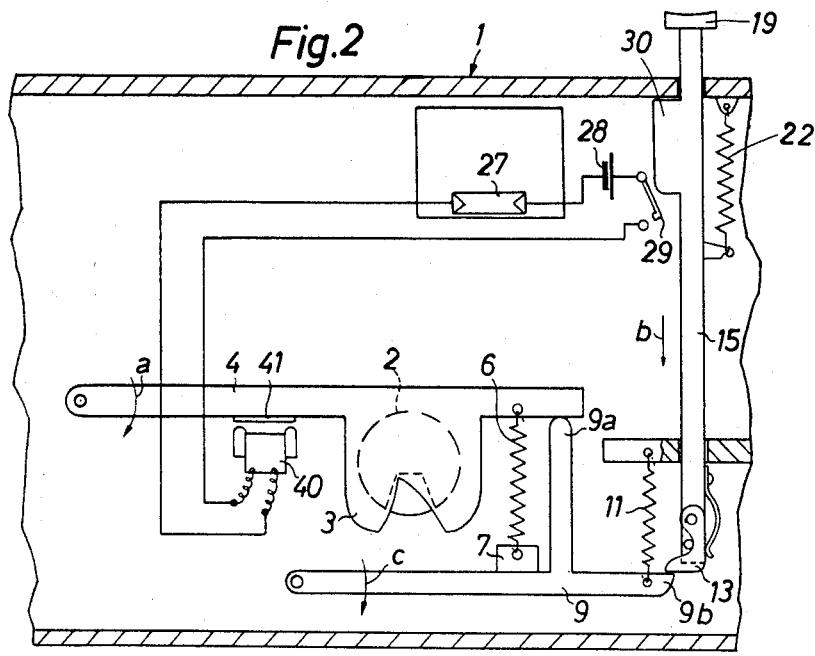
FIG. 2 is a similar fragmentary front elevational view of a camera which embodies a somewhat different exposure control device.

FIG. 2 illustrates a portion of a second camera whose construction is very similar to that of the camera shown in FIG. 1 and whose components are identified in part by the same reference characters. The sole important difference between the two cameras is that the exposure control device 23–26 of FIG. 1 is replaced by a different device including an electromagnet 40 fixed to the housing 1 and a plate 41 of magnetizable material which is secured to the underside of the arm 4. When its coil is energized, the electromagnet 40 tends to attract the plate 41. The electric circuit of the camera shown in FIG. 2 again comprises the components 27, 28, 29 which are connected in series with the coil of the electromagnet 40.

In order to make an exposure, the operator again depresses the pushbutton 19 in order to displace the trigger 15 in the direction indicated by the arrow *b* whereby the trip 30 immediately closes the control switch 29. In response to further depression of the pushbutton 19, the pawl 13 moves beyond the end portion 9*b* of the impeller 9 and the spring 11 contracts to propel the impeller 9 in a counterclockwise direction, as viewed in FIG. 2, whereby the extension 9*a* transmits an impulse to the arm 4 which is caused to rotate in a counterclockwise direction and to move the shutter blade 3 away from closed position. The coil of the electromagnet 40 is energized in response to closing of the control switch 29, i.e., before the pawl 13 moves beyond the end portion 9*b* of the impeller 9, so that the electromagnet attracts the plate 41 and tends to maintain the shutter blade 3 in closed position before this blade receives an impetus from the extension 9*a*. The exact magnitude of the attracting force produced by the electromagnet 40 depends on the intensity of light which reaches the resistor 27, and such attracting force is stronger if the intensity of incoming light is higher because the resistance of the resistor 27 decreases with increasing light intensity. In other words, the electromagnet 40 will cause the shutter blade 3 to reverse the direction of its movement from closed position more rapidly if the intensity of incoming light is higher to thus insure that the exposure time is shorter. The exposure time will be longer if the intensity of incoming light is weaker.

In the camera of FIG. 2, the electromagnet 40 simultaneously performs the function of the stop 8 of FIG. 1. Thus, when the impeller 9 moves away from the lug 7, the plate 41 can move into actual abutment with the electromagnet 40 and then prevents further clockwise displacement of the arm 4 and shutter blade 3. However, it is clear that the camera of FIG. 2 may be provided with a separate stop which determines the maximum clockwise rotation of the arm 4.

The length of the exposure time depends on the resistance which the electromagnet 40 can offer to the impetus transmitted to the arm 4 by the extension 9*a* of the impeller 9. Thus, the exposure time will be longer if a larger percentage of such impetus is needed to overcome the attracting force of the electromagnet 40. This attracting force influences not only the extent of movement of the shutter blade 3 from closed position but also the speed at which the blade is displaced from such closed position. Consequently, the electromagnet 40 can also control the effective size of the diaphragm opening 2 because, if the attracting force is very strong, the blade 3 will expose only a portion of the opening 2, i.e., not the entire opening. The same observation holds true for the camera of FIG. 1.

The manner in which the trigger 15 returns to idle position to allow reopening of the control switch 29 and to allow contraction of the return spring 22 is the same as described in connection with FIG. 1.

FIG. 3 illustrates a third camera wherein the shutter comprises two relatively movable blades or sectors 50, 51. When allowed to assume their closed positions (as actually shown in FIG. 3), the shutter blades 50, 51 fully conceal a diaphragm opening 52. The blade 50 comprises an arm 53 which is rockable on a pivot pin 54 fixed to the housing 1 and must move in the direction indicated by an arrow *e* in order to travel toward its open position. The other blade 51 also comprises an arm 55 which is rockable on a fixed pin 56 and must travel in the direction of the arrow *f* in order to move the blade 51 toward open position. The arms 53, 55 are respectively biased with a constant force by helical springs 57, 58 which tend to maintain them in abutment with fixed stops 59, 60. When the shutter is idle, the arms 53, 55 actually abut against an extension 61*a* of a lever-shaped impeller 61 which is rockable on a pivot pin 62 and whose end portion 61*b* bears against a motion transmitting pawl 65 pivotably mounted at the lower end of a reciprocable trigger 67. The impeller 61 is biased with a constant force by a return spring 68 which maintains its end portion 61*b* in abutment with the pawl 65. The pivot pin for this pawl is mounted on the trigger 67 and is indicated at 66.

The electric circuit of the camera shown in FIG. 3 again comprises a light-sensitive resistor 69 which is connected in series with a battery 70 and a normally open control switch 71 adapted to be closed by a trip 72 on the trigger 67. The resistor 69 is further connected in series with the coil of a fixed electromagnet 64 which is adjacent to the impeller 61 and forms part of an exposure control device. This exposure control device further includes a permanent magnet 63 which is mounted on the impeller 61 directly below the electromagnet 64. A relatively strong return spring 73 tends to maintain the trigger 67 in the idle position of FIG. 3.

The construction of the exposure control device is such that like poles of the permanent magnet 63 and electromagnet 64 are adjacent to each other, i.e., when energized, the electromagnet tends to repel the permanent magnet and the impeller 61.

In order to make an exposure, the user applies finger pressure against the pushbutton 67*a* to move the trigger 67 in the direction indicated by an arrow *b*. The pawl 65 cocks the impeller 61 by moving it in the direction of the arrow *c* whereby the impeller moves the permanent magnet 63 away from the electromagnet 64. The latter is energized immediately after the trigger 67 leaves its idle position because the trip 72 closes the normally open control switch 71. The strength of the electromagnetic field produced by the electromganet 64 depends on the intensity of light which impinges agaisnt the resistor 69, i.e., the field of the electromagnet will be stronger if the intensity of incoming light is higher. When the impeller 61 is fully cocked, the pawl 65 moves beyond the end portion 61b and the impeller is free to follow the bias of the spring 68 to transmit an impetus to the arms 53, 55 via extension 61a. The impetus which is transmitted to the arms 53, 55 will be weaker if the field of the electromganet 64 is stronger because the electromagnet then repels the permanent magnet 63 with a greater force so that a larger portion of the impetus is spent to overcome the resistance of the electromagnet 64. Consequently, the exposure time will be shorter because the springs 57, 58 will return the shutter blades 50, 51 to closed position as soon as the remainder of the impetus is spent to overcome the bias of these springs by rocking the levers 53, 55 in directions which are respectively indicated by the arrows e and f. The exposure control device 63, 64 actually determines two parameters of the exposure value, namely, the exposure time and the effective size of the diaphragm opening 52 because the effective size of this opening will be less if the impetus transmitted by the extension 61a is spent more rapidly, i.e., if the field of the electromagnet 64 is stronger because the intensity of light impinging against the resistor 69 is stronger.

Once the impetus is spent, the springs 57, 58 return the arms 53, 55 into actual abutment with the stops 59, 60 because the electromagnet 64 remains energized and repels the permanent magnet 63 so that the impeller 61 cannot reassume its position of rest. If the operator thereupon releases the pushbutton 67a, the return spring 73 contracts and the pawl 65 pivots on the pin 66 against the bias of a leaf spring 66a in order to reassume the position of FIG. 3. The trip 72 moves away from the control switch 71 so that the flow of current is interrupted and the field of the electromagnet 64 collapses. This electromagnet then ceases to repel the permanet magnet 63 and the spring 68 returns or maintains the impeller 61 in the position of rest. This causes the extension 61a to return into abutment with the arms 53, 55 which may be slightly lifted off their respective stops 59, 60.

Referring finally to FIG. 4, there is shown a portion of a fourth camera which is very similar to the camera of FIG. 1 but is provided with auxiliary equipment enabling the operator to determine whether or not the illumination of the subject is sufficient to make a satisfactory exposure. Furthermore, the arrangement shown in FIG. 4 enables the operator to determine the condition of a source 84 of electrical energy. It is to be noted that, though FIG. 4 illustrates such auxiliaries in a camera of the type described in connection with FIG. 1, the same or analogous auxiliaries are equally useful in the camera of FIG. 2 or 3.

The electric circuit of FIG. 4 comprises the aforementioned source 84 (e.g., a battery) which is connected in series with an energizable coil 80 (corresponding to the coil 25 of FIG. 1), with a light-sensitive resistor 81, with a normally closed battery testing switch 82 and with a normally open control switch 83. The switch 83 may be closed by the trip 94 of a reciprocable trigger 93.

The means for testing the condition of the battery 84 comprises a fixed resistor 85 which is connected in parallel with the resistor 81, and the aforementioned testing switch 82 which may be moved to a second position to disconnect the resistor 81 and to replace it with the fixed resistor 85.

The means for indicating the intensity of light coming from a viewed scene or subject comprises a marker or index 89 which is movable into and from the field of vision through a viewfinder window 90. The index 89 is mounted on one arm of a support here shown as a bell crank lever 87 which is rockable on a pivot pin 88 and the other arm of which carries a paramagnetic member 86. A spring 91 normally biases the lever 87 to a starting position in which the lever abuts against a fixed stop 92. In such starting position, the lever 87 maintains the index 89 in the field of vision, i.e., in front of the window 90 so that the index will be seen by the user of the camera as soon as the user looks through the viewfinder.

The space 80a in the coil 80 extends all the way through this coil, and its upper end portion may accommodate the member 86 on the lever 87. The lower end portion of this space can receive the permanent magnet 23 of FIG. 1. The member 86 constitutes a movable armature of the electromagnet which includes the coil 80 and is attracted by the coil when the operator completes the electric circuit by depressing the pushbutton 93a in order to displace the trigger 93 in the direction indicated by the arrow b and by thus closing the control switch 83 via trip 94. By looking through the window 90 and by noting that the index 89 disappears from view in response to completion of the electric circuit, the operator knows that the lighting conditions are satisfactory because, otherwise, the resistance offered by the resistor 81 would be such that the field of the coil 80 would be too weak to withdraw the index 89 from the field of vision.

If the intensity of light which reaches the resistor 81 is too weak, the latter offers too much resistance to the flow of electric current therethrough and the coil 80 is not energized at all or is energized only to such an extent that its field cannot displace the armature 86 and the index 89 against the bias of the spring 91. The index 89 remains in the field of vision and the operator is warned not to continue with depression of the pushbutton 93a because cocking of the non-illustrated impeller and subsequent movement of the shutter blade or blades to open position would result in taking of an unsatisfactory picture. The operator then simply releases the pushbutton 93a so that the spring 93b returns the trigger 93 to idle position and the trip 94 allows the control switch 83 to open in order to interrupt the flow of electric current.

The trigger 93 is also provided with a projection 15a of the type described in connection with FIG. 1. The torsion spring 15b of FIG. 1 is not actually shown but is also provided in the camera of FIG. 4 to enable the user to sense when the trip 94 closes the control switch 83. The position of the spring 15b is such that the projection 15a engages its terminal 15f (see FIG. 1) before the trigger 93 actually releases the impeller. Thus, and by depressing the pushbutton 93a in the direction of the arrow b, the operator first closes the control switch 83 to complete the electric circuit and then causes the projection 15a to reach the terminal 15f of the spring 15b. The operator then knows that the circuit is completed and watches the index 89. If the index has disappeared, he knows that he can continue with depression of the pushbutton 93a so as to make an exposure. On the other hand, if the operator senses the resistance of the spring 15b but notes that the index 89 does not disappear, he knows that he should not continue with depression of the pushbutton 93a because the exposure would be unsatisfactory.

If the operator wishes to determine the condition of the battery 84, he turns the testing switch 82 so that the variable resistor 81 is disconnected and is replaced by the fixed resistor 85. The resistance of this resistor 85 is selected in such a way that it allows for flow of a current which is just strong enough to cause retraction of the index 89 from the window 90. Thus, if the battery 84 is too weak so that the index 89 does not disappear in response to such depression of the pushbutton 93a as is necessary to close the control switch 83, the operator knows that the battery 84 must be recharged or replaced by a fresh battery.

It is clear that my improved camera is susceptible of many additional modifications without departing from the spirit of the present invention. For example, the light-sensitive resistor 27 and battery 28 of FIG. 1 (or the corresponding components of the circuits shown in FIGS. 2, 3 and 4) could be replaced by one or more photoelectric cells which produce current in response to exposure to light rays. Also, the camera of my invention may utilize other types of shutters wherein one or more blades or sectors are movable from open position in response to impacts transmitted by one or more impellers. Also, the reciprocable trigger 15, 67 or 93 could be replaced by a rockable lever-shaped trigger. Still further, the light-sensitive resistor 27, 69 or 81 could be replaced by a variable resistor which is not sensitive to changes in light intensity. The resistance of such a variable resistor could be adjusted by hand.

The diaphragm aperture 2 is appropriately provided with a firm cover plate 32. This cover plate, in interaction with slot 31 of sector 3, makes sure that it is always the middle part of the diaphragm which opens at every exposure, even when the way covered by sector 3 is very short.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a camera, means defining a diaphragm opening; a shutter comprising at least one sector movable between a closed position and an open position in which said sector respectively conceals and exposes at least a portion of said opening; an impeller movable from a cocked position toward a position of rest and arranged to thereby transmit to said sector an impetus in a direction to move the sector from said closed position; and an exposure control device including electromagnetic means for regulating the speed and extent of movement of said sector from closed position.

2. A structure as set forth in claim 1, wherein said electromagnetic means comprises a coil energizable to produce an electromagnetic field and means connected in circuit with said coil to control the strength of said electromagnetic field.

3. A structure as set forth in claim 2, wherein said electromagnetic field directly opposes the movement of said sector from closed position.

4. A structure as set forth in claim 3, wherein said exposure control device further comprises a permanent magnet movable with said sector toward said coil in response to movement of said sector from closed position, said electromagnetic means and said permanent magnet having like poles adjacent to each other so that said coil opposes movement of said sector from closed position.

5. A structure as set forth in claim 3, wherein said exposure control device further comprises a portion of paramagnetic material movable with said sector away from said coil in response to movement of said sector from closed position whereby said electromagnetic field opposes such movement of said paramagnetic portion.

6. A structure as set forth in claim 2, wherein said electromagnetic field directly opposes movement of the impeller toward said position of rest.

7. A structure as set forth in claim 6, wherein said exposure control device further comprises a permanent magnet movable with said impeller toward said coil in response to movement of the impeller from cocked position, said electromagnetic means and said permanent magnet having like poles adjacent to each other so that said coil repels the permanent magnet to thereby reduce the strength of said impetus.

8. A structure as set forth in claim 2, further comprising manually operated trigger means movable from an idle position to thereby displace said impeller from said position of rest to cocked position, and biasing means for urging said impeller to the position of rest with a constant force.

9. A structure as set forth in claim 2, further comprising biasing means for permanently urging said sector to closed position with a fixed force.

10. A structure as set forth in claim 9, wherein said shutter comprises a single sector which fully conceals the diaphragm opening in said closed position thereof.

11. A structure as set forth in claim 9, wherein said sector comprises a cutout and further comprising a shield filling a portion of said opening and overlying said cutout in the closed position of said sector.

12. A structure as set forth in claim 2, wherein the means to control the strength of said electromagnetic field comprises a light-sensitive element connected in series with said coil.

13. A structure as set forth in claim 12, wherein said light-sensitive element is a resistor.

14. A structure as set forth in claim 13, wherein said circuit further comprises a source of electrical energy and a normally open control switch both connected in series with said coil and said resistor, and further comprising manually operated trip means for closing said control switch to thereby complete said circuit.

15. A structure as set forth in claim 14, further comprising trigger means connected with said trip means and movable by hand from an idle position to thereby close said control switch, said trigger means having a portion arranged to move said impeller to cocked position in response to movement from said idle position and to release said impeller subsequent to closing of said control switch so that said coil is energized before the sector receives an impetus.

16. A structure as set forth in claim 2, further comprising means for indicating the strength of said electromagnetic field.

17. A structure as set forth in claim 16, wherein said indicating means comprises a support movable between two spaced positions, an index carried by said support and observable by the operator in one of said positions, resilient means for biasing said support to said one position with a constant force, and an armature adjacent to said coil so as to be attracted by the energized coil and to thereby displace said support to the other position when the strength of said electromagnetic field suffices to overcome the bias of said resilient means.

18. A structure as set forth in claim 17, wherein said support is a two-armed lever which is rockable between said positions, said index being provided on the one arm and said armature being provided on the other arm of said lever.

19. A structure as set forth in claim 17, further comprising a window providing to the observer a field of vision, said index being observable through said window in said one position of said support.

20. A structure as set forth in claim 16, wherein said circuit further comprises a source of electrical energy connected in series with said coil and said means to control the strength of said field comprises a plurality of resistors and means for connecting one of said resistors at a time in series with said source and said coil.

21. A structure as set forth in claim 20, wherein one of said resistors is a light-sensitive resistor.

22. A structure as set forth in claim 20, wherein one of said resistors is a fixed resistor and another of said resistors is a variable resistor.

References Cited

UNITED STATES PATENTS

| 2,887,938 | 5/1959 | Nassour et al. | 95—55 XR |
| 3,081,683 | 3/1963 | Horton et al. | 95—59 |
| 3,220,326 | 11/1965 | Scudder | 95—10 |
| 3,353,462 | 11/1967 | Suzuki | 95—10 |

NORTON ANSHER, *Primary Examiner.*

J. F. PETERS, *Assistant Examiner.*